United States Patent
Blomstrand et al.

(10) Patent No.: US 12,291,290 B2
(45) Date of Patent: May 6, 2025

(54) DOLLY

(71) Applicant: Volvo Truck Corporation, Gothenburg (SE)

(72) Inventors: Jesper Blomstrand, Härryda (SE); Torbjörn Wiklund, Trollhättan (SE); Marcus Niklasson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 387 days.

(21) Appl. No.: 17/798,611

(22) PCT Filed: Feb. 17, 2020

(86) PCT No.: PCT/EP2020/054061
§ 371 (c)(1),
(2) Date: Aug. 10, 2022

(87) PCT Pub. No.: WO2021/164845
PCT Pub. Date: Aug. 26, 2021

(65) Prior Publication Data
US 2023/0138277 A1 May 4, 2023

(51) Int. Cl.
*B62D 53/08* (2006.01)
*B60K 1/00* (2006.01)

(52) U.S. Cl.
CPC ............ *B62D 53/0864* (2013.01); *B60K 1/00* (2013.01); *B60K 2001/006* (2013.01)

(58) Field of Classification Search
CPC .............................. B62D 53/0864; B60K 1/00; B60K 2001/006; B60K 11/04; B60K 2001/001; B60K 2001/005; B60Y 2200/145
See application file for complete search history.

(56) References Cited

U.S. PATENT DOCUMENTS

| 5,348,332 A | * | 9/1994 | Hamilton | ................. | B60D 3/00 |
| | | | | | 280/416.2 |
| 6,397,965 B1 | * | 6/2002 | McFarlane | ............. | B60L 50/16 |
| | | | | | 180/68.5 |

FOREIGN PATENT DOCUMENTS

| EP | 3290305 A1 | 3/2018 |
| WO | 2007070988 A1 | 6/2007 |
| WO | 2015164914 A1 | 11/2015 |
| WO | 2018162030 A1 | 9/2018 |
| WO | 2018218351 A1 | 12/2018 |

OTHER PUBLICATIONS

Intention to Grant for European Patent Application No. 20706660.6, mailed Oct. 6, 2023, 25 pages.
International Search Report and Written Opinion for International Patent Application No. PCT/EP2020/054061, mailed Nov. 12, 2020, 13 pages.

* cited by examiner

*Primary Examiner* — Jacob M Amick
*Assistant Examiner* — Charles J Brauch
(74) *Attorney, Agent, or Firm* — Withrow & Terranova, PLLC

(57) ABSTRACT

A dolly adapted to be coupled to a semitrailer, where the dolly comprises a first steerable axle and a second axle provided with a drive unit, and where the dolly comprises a fifth wheel and a drawbar, where the dolly further comprises a cover having a front compartment in front of the first axle, where the front compartment comprises a first radiator, and where the cover comprises a first air opening adjacent the drawbar. In this way, a dolly with integral cooling is provided.

15 Claims, 3 Drawing Sheets

DOLLY

This application is a 35 USC 371 national phase filing of International Application No. PCT/EP2020/054061, filed Feb. 17, 2020, the disclosure of which is incorporated herein by reference in its entirety.

TECHNICAL FIELD

The present invention relates to a dolly to be used in a vehicle combination comprising a truck or a tractor and at least one semitrailer. The dolly is provided with a steerable axle, a drive unit propelling a second axle and a cover.

BACKGROUND ART

There are several initiatives to allow for longer vehicle combinations. In one example, a truck pulls a semitrailer using a dolly for the semitrailer, which gives a vehicle length of 25.25 metres. In another example, a tractor pulls two semitrailers using a dolly for the second semitrailer, which gives a vehicle length of 32.00 metres. Longer vehicle combinations, known as road trains, may pull three or more semitrailers.

One reason for using longer vehicle combinations is to reduce fuel usage. At the same time, road usage is reduced, and the cost for drivers are reduced as well, since a single driver may drive two or three full 40 ft. containers.

In such a vehicle combination, the semitrailer is coupled to a dolly, which is a small vehicle comprising one, two or three wheel axles, a drawbar and a fifth wheel coupling for the semitrailer. The drawbar is normally a rigid drawbar. The dolly may also comprise brakes.

In order to increase the manoeuvrability of such a long vehicle combination, it is known to provide the dolly with an active steering functionality, such that e.g. the turning radius of the vehicle combination is reduced. This will allow the vehicle combination to better negotiate curves and roundabouts. It has also been proposed to provide an autonomous dolly with an electric motor for propulsion and a power source (battery) for the electric motor, steering capability, and braking capability.

WO 2018162030 A1 discloses an autonomous dolly comprising an electric motor for propulsion, a power source (battery) for the electric motor, a trailer coupling device (e.g. including a fifth wheel for coupling to the semi-trailer), steering capability, and braking capability. The autonomous dolly does not have any cab. EP 3290305 A1 discloses a dolly comprising a steerable front axle.

These known dollies work well in some applications, but there is still room for improvements.

DISCLOSURE OF INVENTION

An object of the invention is therefore to provide an improved dolly for a vehicle combination. A further object of the invention is to provide a vehicle combination comprising such a dolly.

The solution to the problem according to the invention is described in the characterizing part of claim 1 with regards to dolly and in claim 14 with regards to the vehicle combination. The other claims contain advantageous embodiments and further developments of the dolly.

In a dolly adapted to be coupled to a semitrailer, where the dolly comprises a first steerable axle and a second axle provided with a drive unit, and where the dolly comprises a fifth wheel and a drawbar, the object of the invention is achieved in that the dolly further comprises a cover having a front compartment in front of the first axle, where the front compartment comprises a first radiator, and where the cover comprises a first air opening adjacent the drawbar.

By this first embodiment of the dolly according to the invention, the dolly is provided with a cover that will reduce wind drag and that will further help to protect installed components of the dolly from environmental influences and from dirt etc. expelled from the wheels of various vehicles. The cover may further provide a pleasant view and the design of the dolly can be used to distinguish the dolly from other producers. The inventive dolly allows for the incorporation of a component that requires cooling, such as a drive unit or a battery. The dolly is in one example provided with a drive unit and a battery, each having a radiator arranged at the front of the dolly, where the air intake to the radiator is arranged adjacent the drawbar.

The position of the air intake adjacent the drawbar, arranged at the centre of the dolly, provides several advantages. One advantage is that the air intake is arranged as far as possible from the outer sides of the dolly and thus of the vehicle combination, which reduces the exposure for road spray and thus dirt etc. from other vehicles. Another advantage is that the central position of the air intake takes advantage of the air flow from the vehicle in front of the dolly in a vehicle combination. The distance between the vehicle in front of the dolly and the semitrailer that is coupled to the dolly will cause an underpressure between the vehicle and the semitrailer, which will lead cold air from above the vehicle down towards the centrally positioned drawbar. This cold air will at the same time push away warmer air originating from the engine of the truck or tractor. A further advantage is that the air intake is not very visible from the sides of the dolly, which may give a design advantage and a cleaner appearance of the dolly.

A radiator is provided in a front compartment of the dolly, in front of the first axle. The radiator is in one example arranged more or less vertically, but depending on the installation and internal air deflectors, the radiator may also be arranged in any position between vertically to horizontally. In one example, the radiator is arranged in a closed section in the front compartment, where the closed section is provided with an air intake corresponding to the air opening of the cover, and with an air outlet ending in front of a wheelhouse of the dolly. The radiator will divide the closed section in a cold, front part and a warmer, rear part with the radiator in between. This will prevent any recirculation of warm air to the front of the radiator, which may otherwise decrease the cooling capacity of the radiator. This is especially important when the radiator is adapted to cool heat sensitive equipment, such as batteries.

The radiators are in the shown example liquid radiators, connected to liquid cooling circuits. The first radiator is connected to a first cooling circuit and the second radiator is connected to a second cooling circuit. The first cooling circuit is adapted to cool the drive unit of the dolly, and the second cooling circuit is adapted to cool the battery. In the shown example, the first cooling circuit is adapted for a coolant temperature of maximum 50 degrees Celsius, and the second cooling circuit is adapted for a coolant temperature of maximum 35 degrees Celsius.

The advantage of having two separate cooling circuits is that different coolant temperatures can be used, one lower temperature for a more heat sensitive component such as a battery, and one higher temperature for a component that is not very heat sensitive, such as an electric motor or a power converter. This will reduce energy loss of the drive system.

In normal drive conditions, the regular airflow to the radiators may e.g. be sufficient to hold the temperature of the first cooling circuit at a required level without having to use the radiator fan. In some conditions, the battery may require less cooling than the drive unit, and in this case, the second cooling circuit may not require the use of a radiator fan.

In one example, each cooling circuit comprises two radiators, where the radiators for the second cooling circuit are positioned in front of the radiators for the first cooling circuit. In this way, the radiator area can be increased, and the temperature of the second cooling circuit can be held at a low value. The air that arrives at the first cooling circuit will then be warmer, which will increase the efficiency of the first cooling circuit, which is held at a higher temperature. The temperature of the first cooling circuit may e.g. be held at a temperature between 50 to 70 degrees.

The second cooling circuit may also comprise a compressor and a condenser in order to increase the cooling capacity, e.g. when the air temperature is too high. This will ensure that the temperature of the second cooling circuit can be held at a temperature that is optimal for e.g. batteries.

The dolly may also comprise a wind deflector adapted to further direct the air flow to the air openings of the cover and thus to the air intake for the radiators. The wind deflector extends from the upper surface of the drawbar to the upper surface of the cover, and the width of the wind deflector preferably corresponds to the width of the drawbar. The wind deflector may be made of metal and may be an integral part of the drawbar, or may be made of plastic and attached to the drawbar. The wind deflector comprises in one example a central opening that will further help to direct the airflow to the air openings of the cover.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
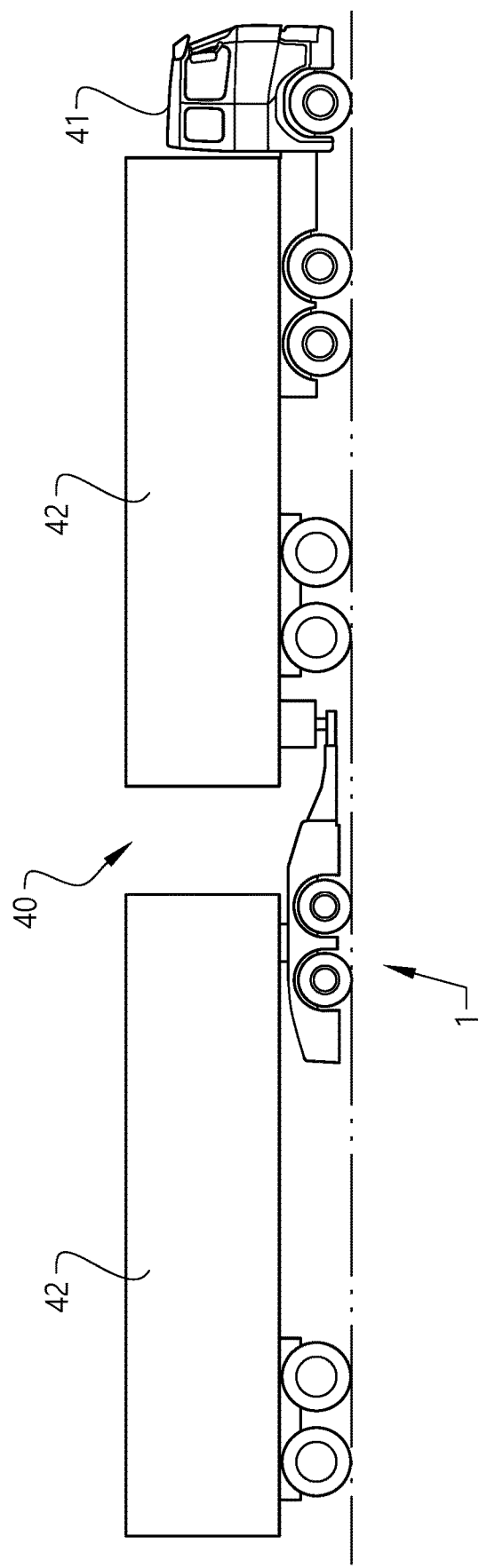
FIG. 1 shows a vehicle combination comprising a dolly according to the invention.
Figure 2:
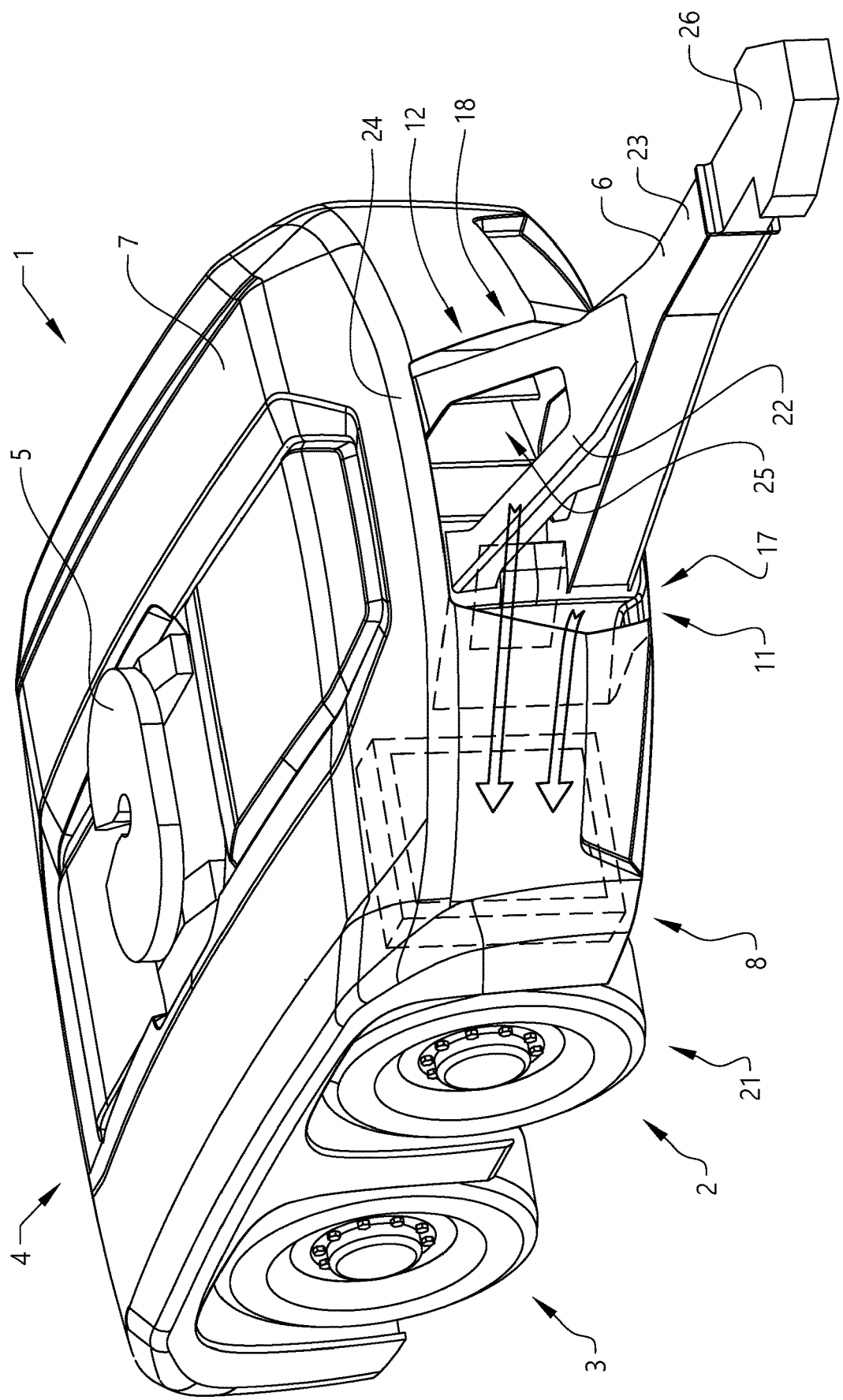
FIG. 2 shows a dolly according to the invention.
Figure 3:
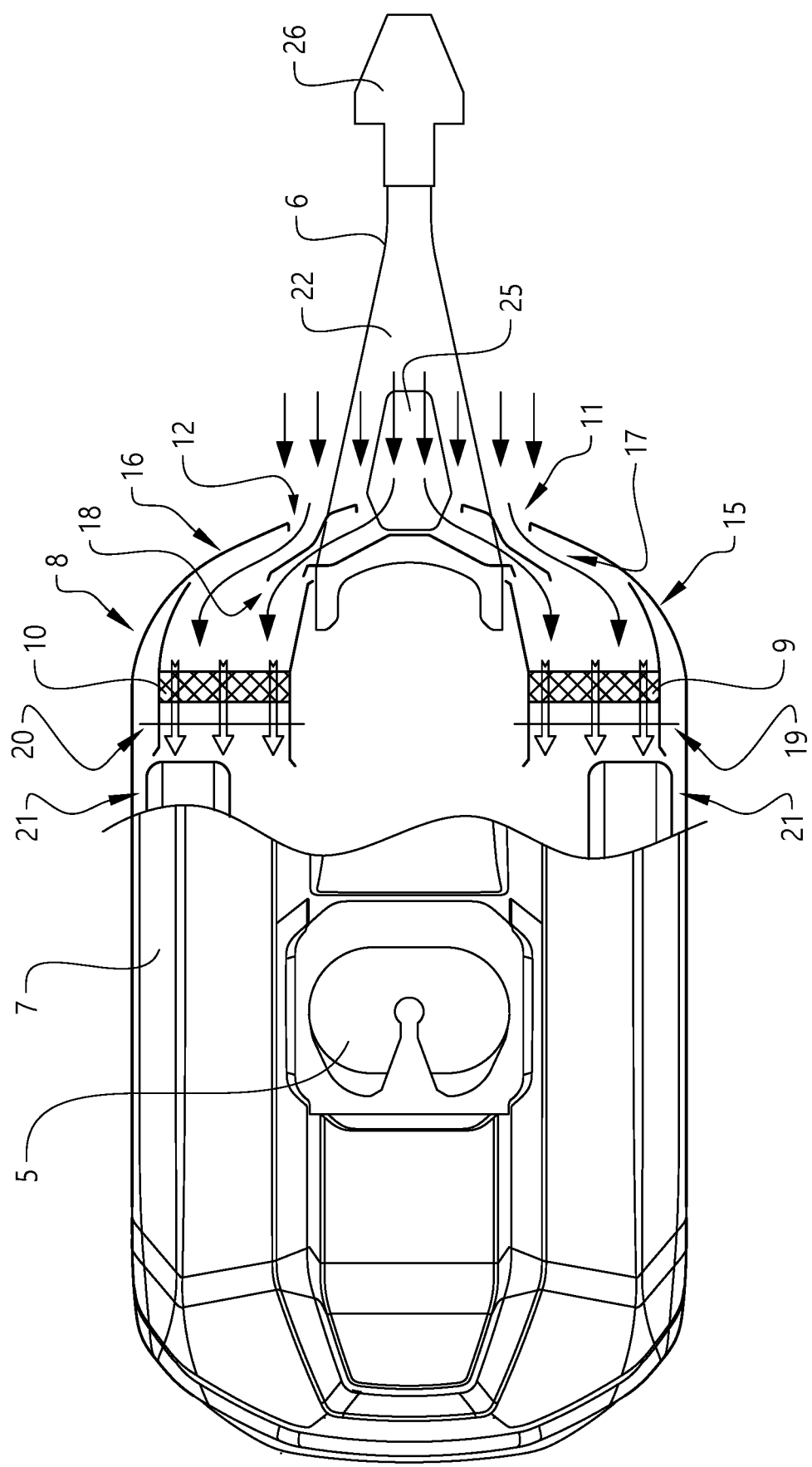
FIG. 3 shows a cut view of a dolly according to the invention.

FIG. 1 shows a vehicle combination and FIGS. 2 and 3 shows a dolly.

The vehicle combination 40 shown in FIG. 1 comprises a tractor 41, a semitrailer 42 coupled to the tractor, a dolly 1 and a semitrailer 42 coupled to the dolly. Such a vehicle combination is often referred to as an A-double. The dolly can of course be used in other types of vehicle combinations, such as e.g. a rigid truck/semitrailer combination or an A-triple combination.

The dolly is adapted to be coupled to a semitrailer 42 through a fifth wheel 5 arranged on top of the dolly 1. The position of the fifth wheel is preferably between the first axle and the second axle of the dolly, such that the weight of the semitrailer is evenly distributed to the two axles, but may be positioned somewhat rearwards depending on the used axles. In the shown example, the rear axle is provided with twin wheels, which may have a higher load capacity.

The dolly 1 is provided with two axles, a steerable front axle 2 and a driven rear axle 3. The steerable front axle may be a conventional steering axle comprising a steering servo. The rear axle 3 is driven by a drive unit 4. In the shown example, the drive unit is an electrical drive unit comprising an electric motor and an electronic power converter that will convert the DC power of a battery unit to a suitable AC power to drive the electric motor. Each rear wheel of the dolly may comprise an electric motor directly driving the rear wheel, or an electric motor may drive the wheels through a differential gear. The drive unit may also comprise a combustion engine, either alone or arranged as a hybrid drive unit.

The dolly is further provided with a drawbar 6 arranged centrally at the front of the dolly. The drawbar is a rigid drawbar fixedly integrated with the chassis of the dolly. The drawbar is provided with a trailer coupling 26 adapted to couple the dolly to a truck or a tractor.

The dolly comprises a cover 7 that covers the complete chassis of the dolly, except for the wheels. The cover preferably comprises several parts that are mounted to each other, which will simplify service and repair of components of the dolly. The dolly further comprises at least one radiator arranged in front of the first axle. In the shown example, the dolly comprises two radiators arranged on each side of the dolly, a first radiator 9 arranged at the right side of the dolly and a second radiator 10 arranged at the left side of the dolly. The chassis of the dolly may e.g. comprise two longitudinal side beams interconnected by cross beams. In this case, each radiator is arranged on the outside of a side beam.

The radiators are arranged at the front of the dolly, in a front compartment 8 in front of the front axle 2. The front compartment may be open to the interior of the dolly and towards the ground. The cover is provided with a first air opening 11 arranged close to the drawbar, at the right side of the drawbar, and adapted to lead air to the first radiator at the right side of the compartment. The cover is also provided with a second air opening 12 arranged close to the drawbar, at the left side of the drawbar, and adapted to lead air to the second radiator at the left side of the compartment. The first air opening and the second air opening may further be provided with an air deflector to direct the air flow directly to the radiator.

In one example, each radiator is arranged in a closed section, where the first radiator 9 is arranged in a first closed section 15, and where the second radiator 10 is arranged in a second closed section 16. The first closed section is provided with a first air intake 17 corresponding to the first air opening 11 of the cover, and a first air outlet 19 ending in front of the right wheelhouse. The second closed section is provided with a second air intake 18 corresponding to the second air opening 12 of the cover, and a second air outlet 20 ending in front of the left wheelhouse.

The air outlets 19, 20 may be directed downwards, towards the road, or upwards. In a closed section, the air flow is better controlled. Air will enter the closed section in a front part and will be forced through the radiator to a rear part and is let out into a wheelhouse or towards the ground. This will prevent any recirculation of warm air to the front of the radiator, which may otherwise decrease the cooling capacity of the radiator. This is especially important when the radiator is adapted to cool heat sensitive equipment, such as batteries. Each radiator may be provided with a fan, which can increase the air flow through the radiator.

The radiators are in the shown example liquid radiators, connected to liquid cooling circuits. The first radiator 9 is connected to a first cooling circuit and the second radiator 10 is connected to a second cooling circuit. The first cooling circuit is adapted to cool the drive motor and the power electronics of the drive unit, and the second cooling circuit is adapted to cool the battery unit. In the shown example, the first cooling circuit is adapted for a coolant temperature of maximum 50 degrees Celsius or more, and the second cooling circuit is adapted for a coolant temperature of maximum 35 degrees Celsius.

The advantage of having two separate cooling circuits is that different coolant temperatures can be used, one lower temperature for a more heat sensitive component such as a battery, and one higher temperature for a component that is not very heat sensitive. This will reduce energy loss of the drive system. In normal drive conditions, the regular airflow to the radiators may be sufficient to hold the temperature of e.g. the first cooling circuit at a required level without having to use the radiator fan. In some conditions, the battery may require less cooling than the drive unit, and in this case, the second cooling circuit may not require the use of the radiator fan.

In one example, each cooling circuit comprises two radiator elements, where the radiator elements for the second cooling circuit are positioned in front of the radiator elements for the first cooling circuit. In this way, the radiator area can be increased, and the temperature of the second cooling circuit can be held at a low value. The air will in this case first cool down the liquid in the second cooling circuit to a relatively low value. The temperature of the air is increased by the front radiator elements for the second cooling circuit, and arrives at the radiator elements for the first cooling circuit with a higher temperature. This will increase the efficiency of the first cooling circuit, which is held at a higher temperature. The temperature of the first cooling circuit may e.g. be held at a temperature between 50 to 70 degrees.

The second cooling circuit may also comprise a compressor and a condenser in order to increase the cooling capacity further, e.g. when the surrounding air temperature is too high. This will ensure that the temperature of the second cooling circuit can be held at a temperature that is optimal for e.g. batteries.

In the shown example, the dolly comprises a wind deflector 22 adapted to further direct the air flow to the air openings 11, 12 of the cover and thus to the air intake 17, 18 for the radiators. The wind deflector extends from the upper surface 23 of the drawbar to the upper surface 24 of the cover, and the width of the wind deflector preferably corresponds to the width of the drawbar. The wind deflector may be made of metal and may be an integral part of the drawbar, or may be made of plastic and attached to the drawbar. The shown wind deflector comprises a central opening 25 that will further help to direct the airflow to the air openings of the cover.

The invention is not to be regarded as being limited to the embodiments described above, a number of additional variants and modifications being possible within the scope of the subsequent patent claims. The dolly may have any size and shape, and may comprise various components that require cooling.

REFERENCE SIGNS

1. Dolly
2: First axle
3: Second axle
4: Drive unit
5: Fifth wheel
6: Drawbar
7: Cover
8: Front compartment
9: First radiator
10: Second radiator
11: First air opening
12: Second air opening
15: First closed section
16: Second closed section
17: First air intake
18: Second air intake
19: First air outlet
20: Second air outlet
21: Wheel house
22: Wind deflector
23: Upper surface of drawbar
24: Upper surface of cover
25: Central opening
26: Trailer coupling
40: Vehicle combination
41: Tractor
42: Semitrailer

The invention claimed is:

1. A dolly adapted to be coupled to a semitrailer, the dolly comprising:
   a first steerable axle;
   a second axle provided with a drive unit;
   a fifth wheel;
   a drawbar; and
   a cover having a front compartment in front of the first steerable axle,
   wherein:
     the front compartment comprises a first radiator, and
     the cover further comprises a first air opening adjacent the drawbar.

2. The dolly of claim 1, wherein the front compartment further comprises a second radiator, and wherein the cover further comprises a second air opening adjacent the drawbar, wherein the first air opening and the second air opening are arranged on opposing sides of the drawbar.

3. The dolly of claim 2, wherein the first radiator is arranged for a first cooling temperature, and wherein the second radiator is arranged for a second cooling temperature, wherein the first cooling temperature is higher than the second cooling temperature.

4. The dolly of claim 1, wherein the first radiator is adapted to cool the drive unit.

5. The dolly of claim 4, wherein the drive unit comprises an electric motor.

6. The dolly of claim 2, wherein the second radiator is adapted to cool a battery unit of the dolly.

7. The dolly of claim 1, wherein the first radiator is arranged in a first closed section of the front compartment with a first air intake corresponding to the first air opening and with a first air outlet ending in front of a wheel house.

8. The dolly of claim 7,
   wherein the front compartment further comprises a second radiator,
   wherein the cover further comprises a second air opening adjacent the drawbar, wherein the first air opening and the second air opening are arranged on opposing sides of the drawbar, and wherein the second radiator is arranged in a second closed section of the front compartment with a second air intake corresponding to the second air opening and with a second air outlet ending in front of the wheel house.

9. The dolly of claim 1, further comprising a wind deflector arranged on the drawbar.

10. The dolly of claim 9, wherein the wind deflector extends from an upper surface of the drawbar to an upper surface of the cover.

11. The dolly of claim 9, wherein the wind deflector is provided with a central opening.

12. The dolly of claim 2, wherein the first radiator and/or the second radiator is provided with a fan.

13. The dolly of claim 2, wherein the first radiator and/or the second radiator comprises two radiator elements arranged at opposing sides of the drawbar.

14. A dolly cover adapted to be mounted on a dolly, the dolly comprising a first steerable axis, a second axle, a fifth wheel, and a drawbar, wherein the dolly cover comprises at least one air opening arranged at a front of the dolly cover.

15. A vehicle combination comprising a tractor or a truck, the dolly of claim 1, and a semitrailer coupled to the dolly.

* * * * *